W. F. CONAHAN.
DRIVER FOR STEEL SPOKED WHEELS.
APPLICATION FILED JULY 17, 1915.
1,187,610.
Patented June 20, 1916.
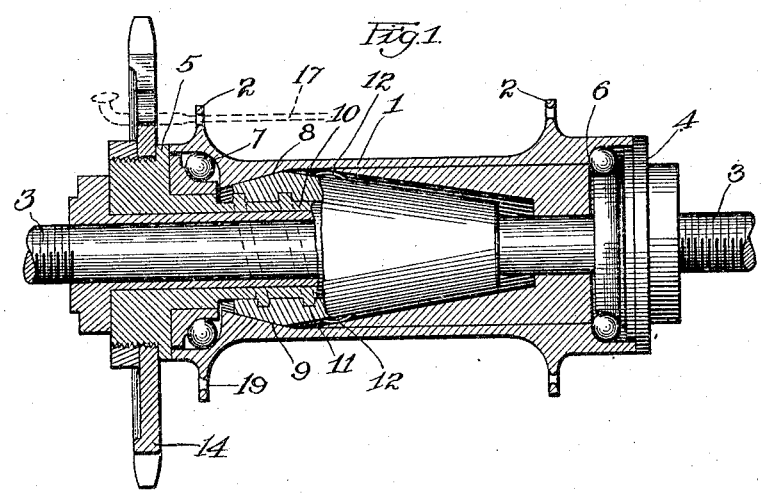
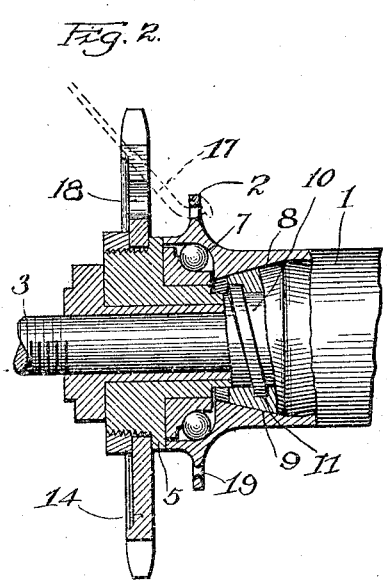
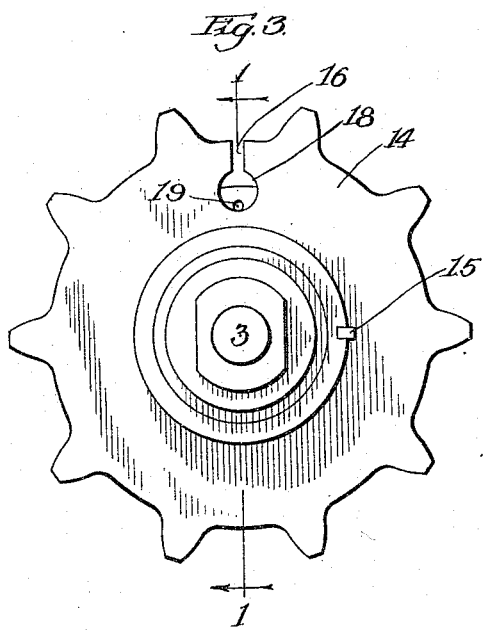
Witnesses:
Leo J. Dumais
Arthur B. Franke
Inventor.
William F. Conahan
By Burton J. Hills
Atty.

UNITED STATES PATENT OFFICE.

WILLIAM F. CONAHAN, OF AURORA, ILLINOIS.
Assigned to the ECLIPSE MACHINE COMPANY, ELMIRA, N.Y.

DRIVER FOR STEEL-SPOKED WHEELS.

1,187,610.

Specification of Letters Patent.  Patented June 20, 1916.

Application filed July 17, 1915. Serial No. 40,439.

*To all whom it may concern:*

Be it known that I, WILLIAM F. CONAHAN, a citizen of the United States, residing at Aurora, in the county of Kane and State of Illinois, have invented certain new and useful Improvements in Drivers for Steel-Spoked Wheels, of which the following is a description.

My invention relates to means attached to the hub of a steel wheel for transmitting power to or from the wheel.

The object of my invention is to provide a device of the kind described so arranged that repairs may be made in the wheel, especially renewals of the spokes of the wheel without removing the driver from the hub.

To this end my invention consists in the novel construction, arrangement and combination of parts herein shown and described and more particularly pointed out in the claims.

In the accompanying drawings wherein like or similar reference characters indicate like or corresponding parts: Figure 1 is a central longitudinal section through my improved driver and the hub to which it is attached, taken substantially on line 1—1 of Fig. 3. Fig. 2 is a similar view to Fig. 1 showing the driver and a portion of the hub with a spoke practically removed from the wheel. Fig. 3 is an end elevation of my improved driver substantially as shown in Fig. 1.

In the form shown in the drawings 1 is the outer shell of a wheel hub having spoke flanges 2—2 near its ends of substantially the usual form and construction. The axle 3 extends centrally through the shell 1 and is provided with the usual cones 4 and 5 adapted to coöperate with the cups 6 and 7 respectively attached to the casing 1 to rotatably support the casing in position upon the axle 3. As shown a part adjacent the cup 7 is tapered or conical as at 8 and a tapered member 9 is provided adapted to coöperate with the portion 8 to rigidly lock the part 9 to the casing 1. The cone 5 is provided with an inwardly projecting sleeve 10 having suitable screw-threaded or helical projections formed on its periphery adapted to coöperate with a groove formed in the interior of the part 9 to control the position of the part 9 in the casing. A spring 12 or other convenient means is provided upon the part 9 to press against the wall of the sleeve 1 to prevent the free rotation of the part 9 in the shell so that when the cone 5 is rotated the part 9 will be moved substantially longitudinally of the shell. The several parts hereinbefore described operate substantially in the usual or ordinary manner, as a coaster-brake and clutch mechanism adapted to rigidly lock the cup 5 to the shell when the relative movement between the shell and cup is in one direction but to immediately release the same and permit their independent movement when the relative movement is in the opposite direction. These parts however form no part of my present invention. As shown my improved driver consists of a sprocket wheel 14 rigidly mounted upon the cone 5 with suitable means, as for example, the key 15 arranged to prevent rotation between the wheel and cone. A channel 16 is formed at the periphery of the wheel 14 and extends radially inward toward the central opening of the wheel sufficiently to permit the disengagement of a spoke 17 from its position in the flange 2 so that it may assume substantially the position shown in Fig. 1.

In the preferred construction a circular opening 18 is formed extending transversely through the body of the driver 14 and the channel 16 extends from the opening 18 to the periphery of the wheel so that when a spoke extends through the opening 18 and engages one of the openings 19 in the flange 2 its outer end may be brought upward to the rim of the wheel. The spoke passes from the opening 18 through the channel 16.

In operation it is obvious that my improved driver may be rotated until the opening 18 is in line with any one of the openings 19 in the flange 2 as shown in Fig. 3, when a spoke may be engaged or disengaged in the manner hereinbefore described after which the driver may be rotated to bring the opening 18 into line with any other of the openings 19 that may be desired.

In the foregoing specification, while I have shown my improved driver as attached to the hub of a bicycle or similar vehicle it is obvious that my improvement may be applied as hereinbefore described to a gear wheel or belt pulley and the several parts be arranged to operate as shown.

Having thus described my improvement it is obvious that various immaterial modifications may be made in my device without departing from the spirit of my invention, hence I do not wish to be understood as limiting myself to the exact form or construction shown.

What I claim as new and desire to secure by Letters Patent is:

1. In a device of the kind described the combination with a hub having a plurality of spokes each engaging a lateral opening through a transverse part upon said hub of a driver rotatably connected to said hub, a transverse channel formed in the periphery of said driver and extending inward to a point substantially opposite the openings in said hub.

2. In a device of the kind described the combination with a hub having a plurality of spokes each engaging a lateral opening through a transverse part upon said hub of a driver rotatably connected to said hub, a transverse channel formed in the periphery of said driver and extending inward to a circular opening extending through said driver at a point substantially opposite the openings in said hub.

3. A driver having a transverse channel at its periphery extending inward to a point adjacent the central opening in said driver, whereby when said driver is rotatably attached to a wheel hub the spokes of said wheel may be turned down into said channel and removed from the hub.

4. A driver having a transverse channel at its periphery extending inward to a circular opening extending through said driver at a point adjacent the central opening in said driver whereby when said driver is rotatably attached to a wheel hub the spokes of said wheel may be turned down into said channel and removed from the hub.

In testimony whereof, I have hereunto signed my name in the presence of two subscribing witnesses.

WILLIAM F. CONAHAN.

Witnesses:
M. KESSEBRING,
WALTER L. WENGER.

Copies of this patent may be obtained for five cents each, by addressing the "Commissioner of Patents, Washington, D. C."